United States Patent [19]
Lim

[11] Patent Number: 6,113,134
[45] Date of Patent: Sep. 5, 2000

[54] AIRBAG SYSTEM OF AUTOMOTIVE VEHICLE

[75] Inventor: Chan-kyu Lim, Suwon, Rep. of Korea

[73] Assignee: Hyundai Motor Company, Seoul, Rep. of Korea

[21] Appl. No.: 09/335,049

[22] Filed: Jun. 16, 1999

[30] Foreign Application Priority Data

Aug. 31, 1998 [KR]  Rep. of Korea ...................... 98-35561

[51] Int. Cl.[7] .................................................. B60R 21/22
[52] U.S. Cl. ...................... 280/730.1; 280/734; 280/742; 180/282
[58] Field of Search .................. 280/730.1, 734, 280/741, 742; 180/282

[56] References Cited

U.S. PATENT DOCUMENTS

5,556,056  9/1996  Kalberer et al. ...................... 280/730.1
5,630,614  5/1997  Conlee et al. ........................ 280/730.1

*Primary Examiner*—Kenneth R. Rice

[57] ABSTRACT

An airbag system of an automotive vehicle, wherein an airbag expanded and deployed to position in front of the vehicle occupant in the event of eccentric, left/right collision is added by a control member for being rotated on an inflator by inertia and for restraining flow direction of gas infused into the airbag, thereby cushioning and protecting the occupant effectively against injury-causing impact from eccentric collision, and the inflator is disposed thereon with a hitching bracket so provided to avoid an interference from the control member and having a hitching unit rotatively supporting a central part of an integral tether, both tip ends of which are separably fixed to an inner surface of the airbag.

4 Claims, 6 Drawing Sheets

AIRBAG SYSTEM OF AUTOMOTIVE VEHICLE

BACKGROUND OF THE INVENTION

1. Field of the Invention

The present invention relates to an airbag of an automatic vehicle, and more particularly to an airbag system of an automotive vehicle adapted to guide a deployed direction of airbag deployed toward automotive vehicle occupants to an advantageous direction in coping with a slant collision when an automotive vehicle eccentrically collides in left/right directions, thereby protecting the automotive vehicle occupants in the collision.

2. Description of the Prior Art

Generally, seat belts are provided in an automotive vehicle as a protective means to prevent automotive vehicle occupants from being injured or killed when an automotive vehicle collides, along with airbags.

The airbag is stowed in an uninflated and folded condition in a covered compartment, each located on the steering wheel or behind the instrument panel, above the glove compartment and before the rear seats, as a safety device for protecting the automotive vehicle occupants in a collision.

Figure 1:
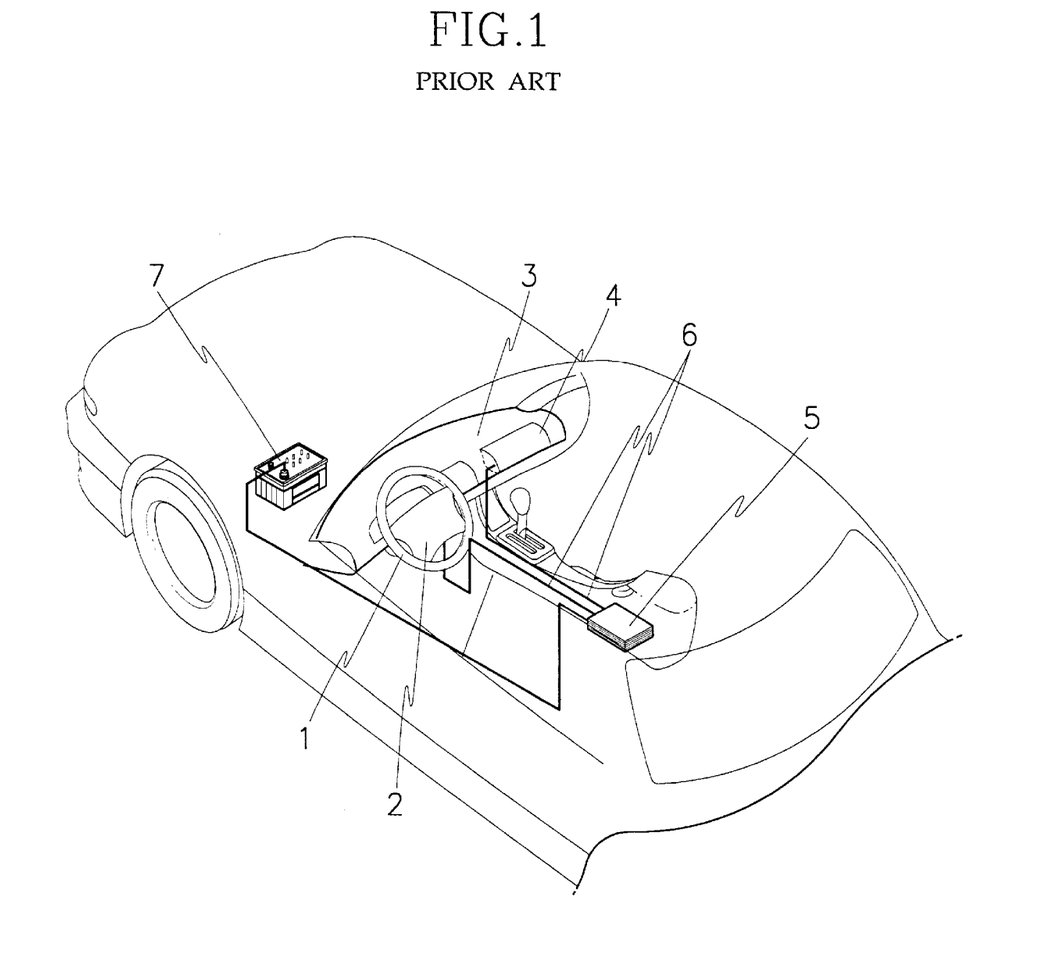
FIG. 1 is a perspective view for illustrating a mounted airbag system according to the prior art.

In other words, the airbags mentioned above as stowed in from of the front seats include, as illustrated in FIG. 1, a driver seat airbag module 2 installed in the center of the steering wheel and a front seat occupant airbag module 4 stowed in the front dashboard 3, where both airbags 2 and 4 are respectively connected to an electronic control unit 5 and a wire harness 6 each disposed underneath the center floor console and the electronic control unit 5 is in turn connected to the wire harness 6 to receive power from a battery 7.

The electronic control unit 5 is mounted therein with acceleration sensors (not shown) for detecting changes of speed (or velocity) of an automotive vehicle. The acceleration sensors detect change of decelerating speed of the running automotive vehicle, and if the detected change of the decelerated speed exceeds a predetermined level, in other words, in the event of a collision, the acceleration sensors send electric signals to the airbag modules 2 and 4 respectively.

Figure 2:
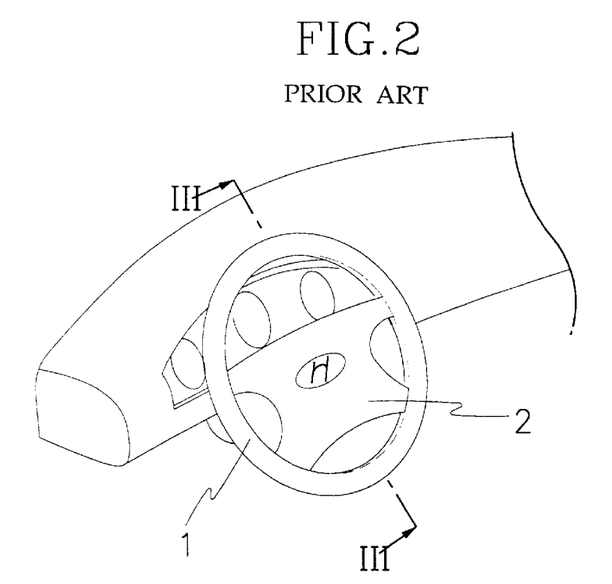
FIG. 2 is a perspective view for illustrating an airbag module mounted on a steering wheel at a driver's seat in FIG. 1.
Figure 3:
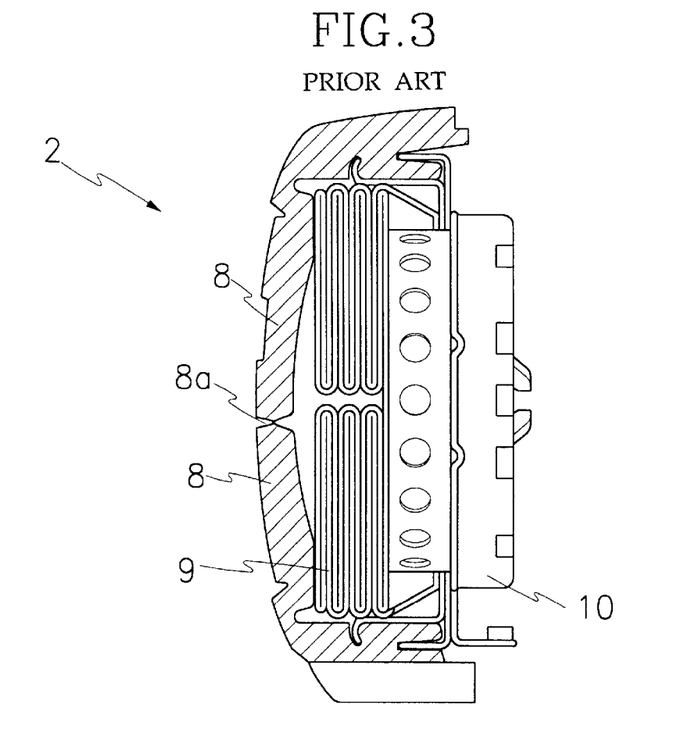
FIG. 3 is a sectional view for illustrating a mounted airbag module taken along line III—III in FIG. 2.

Meanwhile, the drive seat airbag module 2 is mounted in the center of the steering wheel 1, as illustrated in FIG. 2, and interior construction of the driver seat airbag module 2 is shown in FIG. 3 for illustrating a sectional view taken along line III—III in FIG. 2. In other words, the driver seat airbag module 2 includes a pad cover 8 cut and opened when an airbag is deployed via an cut-off part 8a at the center thereof, an airbag 9 accommodated in the pad cover 8, being folded, and an inflator 10 connected to a margin of a bottom surface of the airbag 9 and filled with an explosive, a priming charge, a gas forming agent, a diffuser screen (all not shown) and the like.

When there is a change above a predetermined level in the deceleration of an automotive vehicle in the event of a collision, the acceleration sensors at the electronic control unit 5 detect the change and send electric signals to the driver seat airbag module 2. The power applied to the inflator 10 of the airbag module 2 ignites the explosive and the priming charge in a matter of milliseconds to burn the gas forming agent. Nitric gas generated in the process of burning the gas forming agent is discharge outside of the inflator 10 through the diffuser screen to thereafter be infused into the airbag 9. As a result thereof, the airbag 9 accommodated in the pad cover 8, being folded, is expanded and breaks the cut-off part 8a at the pad cover 8 to be deployed into position in front of the vehicle occupant and to effectively cushion the occupant against injury-causing impact with interior structures of the vehicle.

Figure 4:
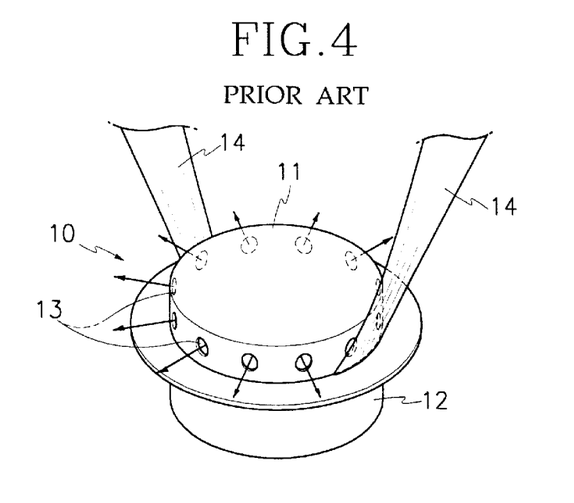
FIG. 4 is a perspective view for illustrating an inflator at the airbag module in FIG. 3.

Meanwhile, the inflator at the driver seat airbag module 2 includes an upper body unit 11 and a lower body unit 12, as illustrated in FIG. 4, where the upper body unit 11 is formed at its periphery with a plurality of gas-discharging vent holes 13, each disposed at an equal radiating distance therebetween, and the upper body unit 11 is also formed at both opposite margins with tethers 14 of flexible material such as fabric, one end of each tether being fixed to the margin while the other end of each tether being stitched and fixed to an inner surface of the airbag 9.

The nitric gas generated from the inflator 10 in the event of a collision is discharged outside of the inflator 10 through the plurality of vent holes provided at the upper body unit 11 and is infused into the airbag 9.

Figure 5:
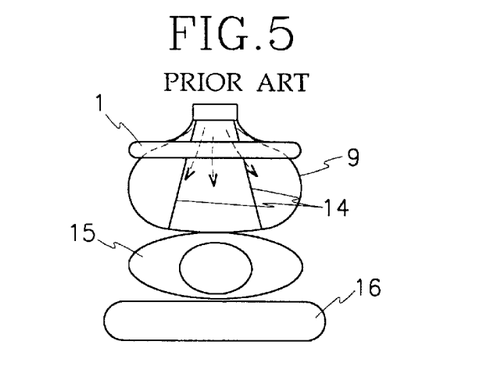
FIG. 5 is a plan view of an airbag module mounted at a steering wheel deployed in the event of a collision according to the prior art.

The airbag 9 expanded by the infused nitric gas is caused to expand and burst widely through the central pad cover 8 at the steering wheel 1 into position in front of the driver to effectively protect him or her from impact.

At this time, the tether 14 serves to restrain the airbag 9 from expanding to an extreme distance when the airbag 9 is expanded by the gas generated from the inflator 10, thereby preventing the occupant from a so-called back slap phenomenon where face of an occupant receives an abrasion due to expanded airbag. Unexplained reference numeral 16 in the drawing is a back supporter of a driver.

Figure 6:
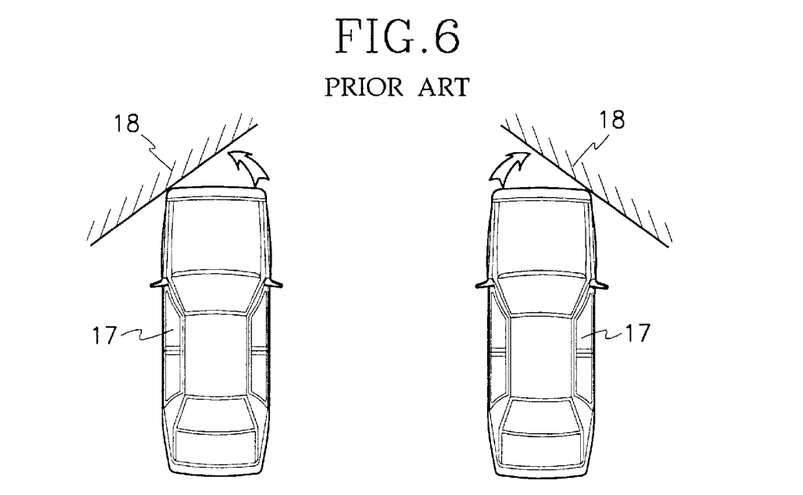
FIG. 6 is a plan view of a running vehicle eccentrically colliding to the left and to the right.

However, there is a problem in the airbag according to the prior art thus constructed in that the airbag 9 according to the conventional airbag system cannot fully cope with left/right slanted collision because the airbag 9 is expanded and deployed evenly in front of a driver 15 even in the event of a left/right slanted collision, let alone the head-on collision with an obstacle 18 (which include vehicles and various kinds of popping obstacles).

In other words, when a running vehicle 17 collides in eccentrically left/right directions, the airbag 9 which is uniformly expanded and deployed in front of the driver 15 regardless of head-on collision or left/right eccentric collisions cannot effectively cushion the driver against injury.

SUMMARY OF THE INVENTION

The present invention is disclosed to solve the aforementioned problem and it is an object of the present invention to provide an airbag system of automotive vehicle adapted to appropriately adjust the flowing direction of gas discharged from an inflator and infused into an airbag to allow a deployed direction of the airbag to cope with body of an automotive occupant which abruptly changes from front to left or left side of the occupant due to inertia, thereby minimizing injury on the occupant.

In accordance with the object of the present invention, there is provided an airbag system of automotive vehicle, the system having an electronic control unit for detecting a collision in the event of the collision, an inflator for receiving a control of the electronic control unit to generate gas and an airbag coupled to the inflator to receive the gas generated therefrom and to thereafter deploy, the system comprises:

a blocking portion for selectively closing a few vent holes disposed at a certain region out of a plurality of vent holes formed radially along a circumference of the inflator; and a control member integrally formed from the blocking portion and disposed with a balance weight portion of heavy weight for rotation by inertia in the event of collision, and mounted for rotation via a pivot unit.

Furthermore, a tip end of the blocking portion is bent to be positioned in an opposite direction from the vent holes formed at the inflator to thereby close the vent holes.

Still furthermore, the inflator is disposed thereon with a hitching bracket so provided to avoid an interference from the control member and having a hitching unit rotatively supporting a central part of an integral tether, both tip ends of which are separably fixed to an inner surface of the airbag.

Meanwhile, the tether is centrally coupled to an auxiliary tether for accommodating a hitching unit therein to restrain a moving distance of the tether.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, a preferred embodiment of the present invention will be described in detail with reference to the accompanying drawings.

Figure 7:
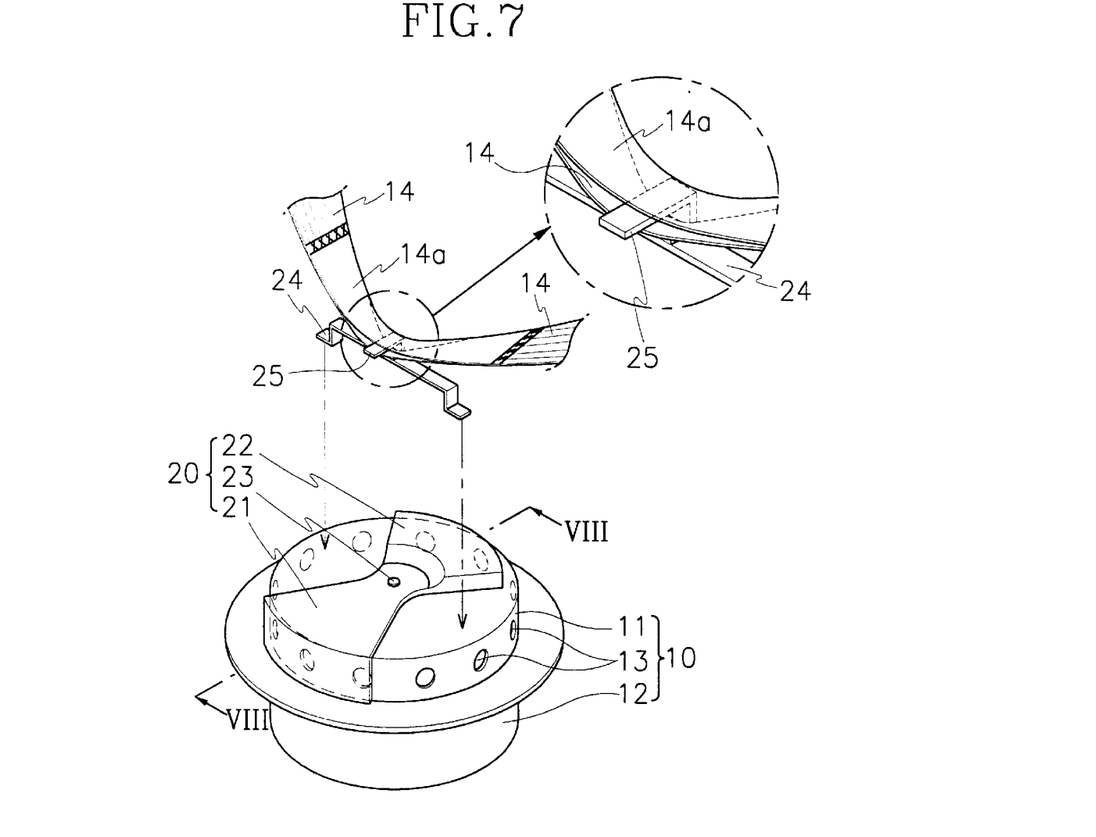
FIG. 7 is a perspective view for illustrating an inflator of an airbag module at an airbag system according to the present invention.
Figure 8:
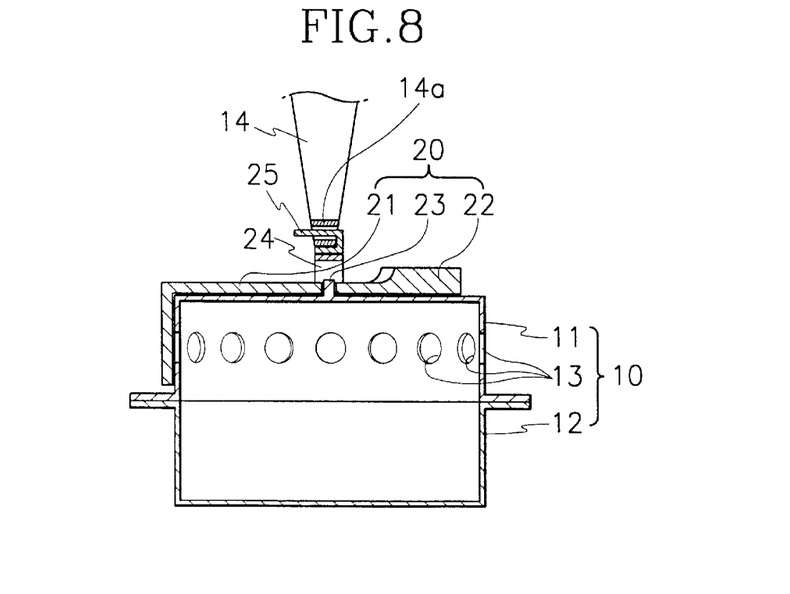
FIG. 8 is a sectional view for illustrating an inflator taken along line VIII—VIII in FIG. 7.

FIG. 7 is a perspective view for illustrating an inflator mounted at an airbag module of an airbag system according to the present invention and FIG. 8 is a sectional view taken along line VIII—VIII in FIG. 7, where, like reference numerals as in FIGS. 1 through 6 are used for designation of like or equivalent parts or portions and detailed explanation thereto will be omitted for simplicity of illustration and description.

The airbag system of an automotive vehicle according to the present invention includes, as illustrated in the drawings, an inflator 10 for generating combustion gas in the event of collision, where the inflator 10 is mounted by a control member 20 rotated by inertia, and the inflator 10 is equipped therein with an explosive, a priming charge and a gas forming agent to be ignited by control of an electronic control unit 5 having acceleration sensors in the event of collision and to generate the combustion gas. The control member 20 serves to adjust flow direction of the nitric gas generated from the inflator 10 and infused into the airbag 9.

At this location, the control member 20 rotatively arranged on an upper body unit 11 of the inflator 10 is disposed with a block portion 21 extensively and fan wise formed at its outer shaped, and angled at 90 degrees at one end thereof to face a few vent holes 13 and to thereby close same, such that only said few vent holes 13 out of a plurality of vent holes 13 each radially formed at an equal distance therebetween along the whole periphery of the upper body unit 11 can be selectively and forcibly closed, and a balance weight portion 22 extensively and integrally formed at the other end of the blocking portion 21, and being a little bit heavier than the blocking portion 21 to allow a rotation according to inertia.

Furthermore, the control member 20 is rotatively disposed on the inflator 10 through a pin-shaped pivot 23 which is externally protruded from the center of the upper body unit 11 to thereby pierce toward the weight center of the blocking portion 21 and the balance weight portion 22.

In other words, the blocking portion 21 at the control member 20 is adhered to predetermined domains of vent holes 13 out of a plurality of vent holes 13 formed at the upper body unit 11 of the inflator 10, as illustrated in FIG. 8, such that only the vent holes 13 positioned at the predetermined domains out of the plurality of vent holes 13 formed at a periphery of the upper body unit 11 are selectively closed.

The balance weight unit 22 at the control member 20 is a little bit heavy, such that, when the control member 20 is rotated on the inflator 10 via the pivot 23, the balance weight unit 22 is rotated downwards of the steering wheel 1 due to its weight to align the control member 20 vertically on the upper body unit 11.

Meanwhile, the tether 14, so disposed as to prevent a back slap phenomenon by being fixed at both tip ends thereof between the inner surface of the airbag 9 and the inflator 10 to thereby limit a deployed distance when the airbag 9 is deployed, is integrally fixed by being separably coupled at both tip ends thereof to inner surface of the airbag to thereby allow movement of approximate central part thereof on the inflator 10, as against the prior art where the tether 14 is independently fixed at both tip ends thereof to inner surface of the airbag 9 and the inflator 10.

Such being the case, a hitching bracket 24 is mounted on the upper body unit 11 of the inflator 10 in order to hitch and support the tether 14 at a central portion thereof. The hitching bracket 24 is horizontally provided on the upper body unit t1 in order to avoid any interference with the control member 20 rotated by inertia in the event of a collision. The hitching bracket 24 is arranged at an upper central portion thereof with a bent hitching unit 25 for hitching and supporting the tether 14.

Furthermore, the tether 14 is centrally disposed with an anxiliary tether 14a stitched and fixed thereto for accommodating therein the hitching unit 25 for supporting the tether 14 such that the control member 20 can be rotated by inertia in the event of eccentric collision to selectively close the vent holes 13 at the predetermined domains out of the plurality of vent holes 13 formed at the inflator 10 via the blocking portion. As a result, ejected direction of gas injected into the airbag 9 is controlled by the control member 20 rotated by the inertia to thereby close the vent holes 13 of the inflator 10 selectively, whereby, the airbag 9 can be eccentrically deployed to a direction corresponding to a slant collision via the gas ejected into the airbag 9 through the vent holes 13 at the inflator 10 which are not closed by the blocking portion 21.

At this time, the tether 14 can control the shape of the airbag 9 when the airbag 9 is eccentrically deployed via the anxiliary tether 14a centrally and movably coupled to the hitching unit 25 of the hitching bracket 24 mounted on the upper body unit 11 at the inflator 11, where a coupling portion between the tether 14 and the auxiliary tether 14a centrally coupled at a predetermined length to the tether 14 is hitched by the hitching unit 25 to limit the movement of the tether 14 and to thereby control the shape of the airbag 9.

Furthermore, when the tether 14 is controlled at its movement by the hitching unit 25 at the hitching bracket 24, the shape of the airbag 9 can be eccentrically and asymmetrically deployed a little bit to the left and right sides when the airbag 9 is deployed in the event of slant collision, and the eccentrically deployed to thereby prevent a back slap phenomenon as is experienced in the prior art.

Now, operational effect of the airbag system of an automotive vehicle according to the present invention will be described in detail with reference to the accompanying drawings.

In an airbag mechanism mounted with the control member 20 on the inflator 10 thus described, when an acceleration sensors inherently disposed in electronic control unit 5 detect a collision, the electronic control unit 5 serves to control the inflator 10 at the driver seat airbag module 2 to sequentially ignite the explosives and priming charges in the inflator 10 to burn the gas forming agent, and nitric gas generated in the process of the gas forming agent being burnt is infused into the airbag 9 through the vent holes 13 formed on the upper body unit 11 of the inflator 10. The airbag 9 is expanded by the nitric gas infused thereinto and the nitric gas breaks the pad cover 8 to be broadly expanded into position in front of the vehicle occupant.

Figure 9A:
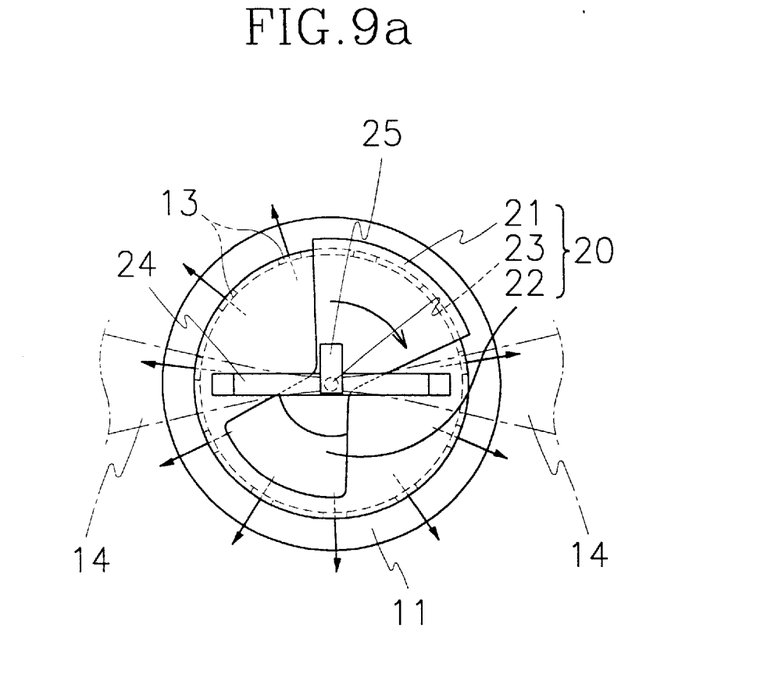
FIGS. 9a and 9b are plan views, each for illustrating a control members movement on an inflator in the event of left or right slanted collision at an airbag system according to the present invention.

At this time, when a left slanted collision occurs where only left front side locally and eccentrically collides, the balance weight portion 22 at the control member 20 is rotated to the left on the upper body unit 11 by the inertia via the pivot 23, while, the blocking portion 21 is rotated to the right on the upper body unit 11, whereby, the vent holes 13 at the predetermined partial domains on the upper right side (based on the drawing) of the upper body unit 11 are locally blocked by the blocking portion 21 (shown in FIG. 9a).

As a result, the nitric gas discharged through the vent holes 13 of the inflator 10 and infused into the airbag 9 is inevitably increased in amount and speed thereof to the left side of the airbag 9 to thereafter by further expedited in infusion into the airbag 9. The airbag 9 is more greatly deployed in its left side thereof into position in front of a bodily portion of an occupant 15 who tends to abruptly move to the left eccentric side after collision, and effectively receives the load of the occupant 15 to thereafter cushion the load.

Figure 10A:
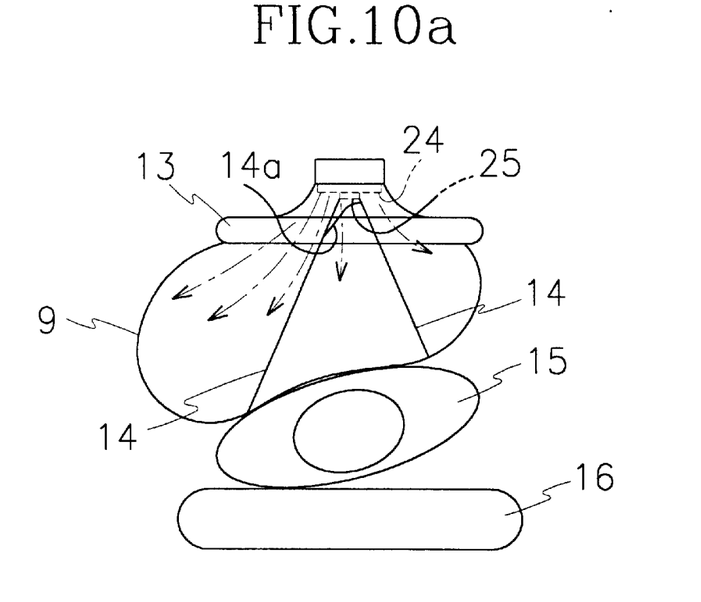
FIGS. 10a and 10b are plan views, each for illustrating an airbag system according to the present invention being operated in the event of left or right slanted collision.

Successively, the tether 14, being hitched at its center portion by the hitching unit 25 of the hitching bracket 24, becomes elongated at its left portion while gets shrunk at its right portion, to thereby allow the left/right unbalanced shapes of the airbag 9 at the initial deployment thereof to be maintained until the airbag 9 is fully deployed, where, left/right length changes of the tether 14 are controlled by the coupling portions at both tip ends of the auxiliary tether 14a centrally fixed to the tether 14 (shown in FIG. 10a).

Figure 9B:
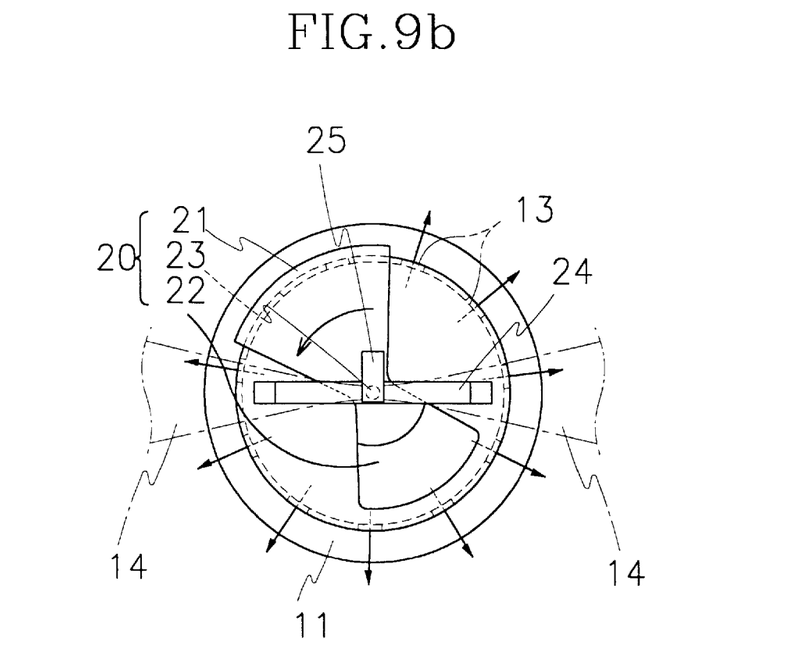

Alternatively, when a right slanted collision occurs where only right front side locally and eccentrically collides, the balance weight portion 22 of the control member 20 is rotated to the right on the upper body unit 11 by the inertia via the pivot 23, while the blocking portion 21 is rotated to the left on the upper body unit 11, whereby, the vent holes 13 at the predetermined partial domains formed on the upper side (based on the drawing) of the upper body unit 11 are locally blocked by the blocking portion (shown in FIG. 9b).

Figure 10B:
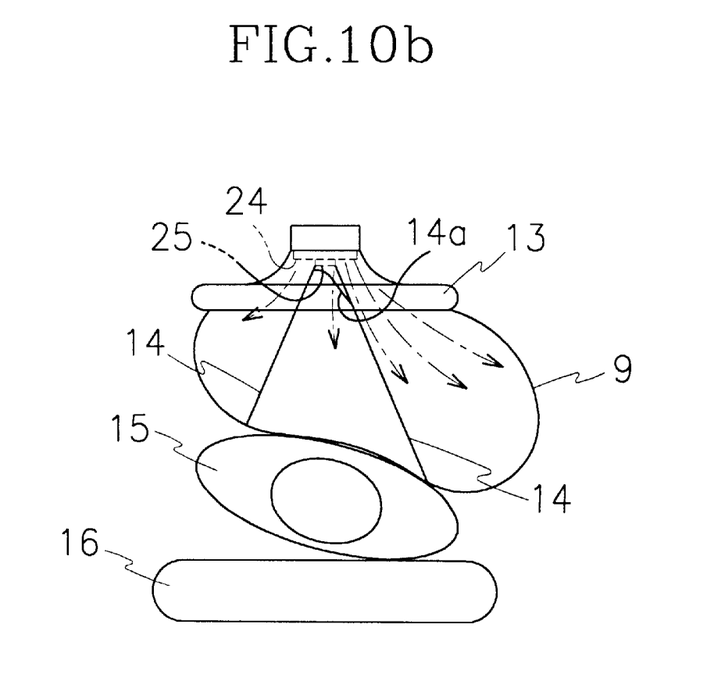

As a result, the nitric gas discharged from via the vent holes 13 of the inflator 10 and infused into the airbag 9 is inevitably increased in amount and speed thereof to the right side of the airbag 9 to thereafter be further expedited in infusion thereof into the airbag 9. The airbag 9 is more greatly deployed in its right side into position in front of a bodily portion of an occupant 15 who tends to abruptly move to the right eccentric side after collision, and effectively receives the load of the occupant 15 to thereafter cushion the load (shown in FIG. 10b).

As mentioned above, the driver seat airbag module 2 at the airbag system is mounted on the upper body unit 11 of the inflator 10 with the control member 20 for being selectively rotated by inertia according to left/right collision and for forcibly blocking a predetermined number of eccentrically provided vent holes 13 out of the plurality of vent holes 13, thereby cushioning the occupant effectively against injury-causing impact from eccentric collision.

Although in the above, the description were made based on the specific embodiment of the present invention where eccentrically-deployed airbag is mounted only on the steering wheel at the driver's seat with reference to the attached drawings, it should be noted that the present invention is not to be limited to the specific embodiment but it can be equally applied to an airbag system at a front passenger seat where an airbag module is mounted on a dashboard, and also to all other airbag systems installed in front of occupants.

Furthermore, various changes and modifications can be made, with the same and equal operations and effects as in the present invention, to the blocking portion 21 for being rotatively disposed on the upper body unit 11 of the inflator 10 to forcibly block a predetermined number of vent holes 13 out of a plurality of vent holes 13 and to the balance weight portion 22 integrally and extensively formed from the blocking portion 21 to be rotated by inertia.

As apparent from the foregoing, there is an advantage in the airbag system of automotive vehicle according to the present invention in that an airbag expanded and deployed to position in front of the vehicle occupant in the event of eccentric, left/right collision is added by a control member for being rotated on an inflator by inertia and for restraining flow direction of gas infused into the airbag, thereby cushioning and protecting the occupant effectively against injury-causing impact from eccentric collision.

What is claimed is:

1. An airbag system of automotive vehicle, the system having an electronic control unit for detecting a collision in the event of the collision, an inflator for receiving a control of the electronic control unit to generate gas and an airbag coupled to the inflator to receive the gas generated therefrom and to thereafter deploy, the system comprises:

a blocking portion for selectively closing a few vent holes disposed at a certain region out of a plurality of vent holes formed radially along a circumference of the inflator; and a control member integrally formed from the blocking portion and disposed with a balance weight portion of heavy weight for rotation by inertia in the event of collision, and mounted for rotation via a pivot unit.

2. The airbag system as defined in claim 1, wherein a tip end of the blocking portion is bent to be positioned in an opposite direction from the vent holes formed at the inflator to thereby close the vent holes.

3. The airbag system as defined in claim 1, wherein the inflator is disposed thereon with a hitching bracket so provided to avoid an interference from the control member and having a hitching unit rotatively supporting a central part of an integral tether, both tip ends of which are separably fixed to an inner surface of the airbag.

4. The airbag system as defined in claim 1, wherein the tether is centrally coupled to an auxiliary tether for accommodating a hitching unit therein to restrain a moving distance of the tether.

* * * * *